United States Patent [19]

Zola

[11] 4,400,627

[45] Aug. 23, 1983

[54] TELEPHONE SWITCHING NETWORK

[75] Inventor: Meyer J. Zola, Oak Park, Ill.

[73] Assignee: Bell Telephone Laboratories, Incorporated, Murray Hill, N.J.

[21] Appl. No.: 260,004

[22] Filed: May 4, 1981

[51] Int. Cl.³ .............................................. H04Q 3/00
[52] U.S. Cl. ................................ 307/115; 179/18 G; 340/825.8
[58] Field of Search ................ 179/18 G, 22; 370/63; 340/825.8; 307/113, 115

[56] References Cited

U.S. PATENT DOCUMENTS

| | | | |
|---|---|---|---|
| 3,737,586 | 6/1973 | Johnson | 370/63 |
| 4,038,497 | 7/1977 | Collins et al. | 370/63 |
| 4,254,498 | 3/1981 | Tawara et al. | 370/63 |

OTHER PUBLICATIONS

"The System X Digital Switching Subsystem (DSS)," A. S. Philip, *System Technology* (Great Britain), Sep. 1979, No. 32, pp. 5-19.
Bell System Technical Journal, Sep., 1977, Section 2.3.2, "Time-Multiplexed Switch Frames," pp. 1035-1037.
Bell System Technical Journal, Mar., 1953, "A Study of Non-Blocking Switching Networks," Charles Clos, pp. 406-424.

*Primary Examiner*—Thomas W. Brown
*Attorney, Agent, or Firm*—K. H. Samples; R. T. Watland

[57] ABSTRACT

An arrangement and method for interconnecting the stages of a space division switching network which provides simple and continuous growth from a small number of lines to the system's maximum number of lines. The switching network comprises up to M input stage switches, center stage switches and up to M output stage switches. Incoming lines are connected to the input terminals of the input stage switches such that no input stage switch is connected to a number of incoming lines which exceeds the number of incoming lines connected to any other input stage switch by more than one. The number of center stage switches is established from a predetermined interconnection plan and at any given time, the number of center stage switches is a function of the number of lines connected to the input stage switch having the largest number of lines connected thereto. As each line is connected to an input stage switch, the output terminals of that switch are distributed over the available center stage switches. The output stage switches are connected to the center stage switches and to outgoing lines in analogous manner.

7 Claims, 7 Drawing Figures

TELEPHONE SWITCHING NETWORK

TECHNICAL FIELD

This invention relates to telephone switching networks and, more particularly, to methods for interconnecting the components of such networks when expansion is necessary.

BACKGROUND OF THE INVENTION

Telephone central offices include switching networks for interconnecting subscribers. As the number of subscribers connected to a given central office increases, the switching network capacity must be able to accommodate corresponding increase in traffic. Known techniques for handling traffic increases have been to fully equip any office which is expected to grow, or to provide discrete growth increments of additional switch capacity. Growth in discrete increments usually requires the addition of significantly more equipment at each step than is actually required adding to the cost of the office. Perhaps more importantly, however, growth in discrete steps has typically required some system downtime at the growth intervals in order to complete the necessary rearrangements of the existing switching equipment. The cost penalties in fully equipping a switching network before such network is needed, can be plainly seen. The present invention is an interconnection and growth method which avoids cost penalties of overequipping a switching network and which allows continuous network growth without system downtime.

SUMMARY OF THE INVENTION

The present invention is a method of interconnection and growth for a switching network comprising up to M input stage switches, each comprising input and output terminals and up to M output stage switches comprising input and output terminals when an equal number of incoming and outgoing lines are present for interconnection to the network. The method of the present invention comprises the steps of connecting each incoming line to one input terminal of one of the input stage switches, such that particular ones of the input stage switches are connected to N incoming lines and the remaining ones of the input stage switches are connected to N−1 incoming lines; providing a number of center stage switches as determined from a predetermined interconnection plan based on the number of input lines N connected to the particular ones of the input stage switches; connecting one output terminal of each input stage which is connected to N incoming lines to one input terminal of each provided center stage switch; and connecting one output terminal of each input stage switch which is connected to N−1 incoming lines to a number of center stage switches determined from a predetermined interconnection plan based on the number of incoming lines N−1. The method further comprises the steps of connecting output stage switches to center stage switches and outgoing lines in a manner substantially identical to the connection of input stage switches to the center stage switches and incoming lines.

In a first example of the present invention, a nonblocking Clos-type network is described in which 2N−1 center stage switches are provided, and each input stage switch which is connected to N−1 incoming lines is connected to 2N−2 of the provided center stage switches. In a second example of the present invention, a second network is described in which N center stage switches are provided, and each input stage switch which is connected to N−1 incoming lines is connected to N−1 of the provided center stage switches.

BRIEF DESCRIPTION OF THE DRAWING

The present invention will be more readily understood when read in conjunction with the drawing in which.

DETAILED DESCRIPTION

Figure 1:
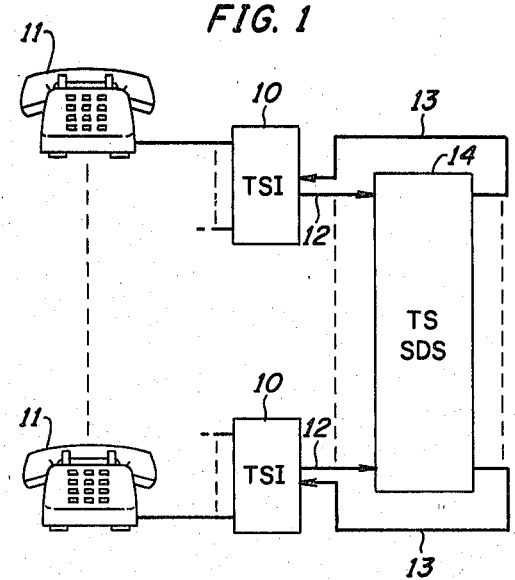
FIG. 1 is a block diagram on a time division switching system embodying the present invention.

FIG. 1 is a block diagram of a time division switching system which can make use of the present invention. The time division switching system of FIG. 1 includes up to 256 time-slot interchange units 10 connected to a plurality of subscriber sets 11. Each time-slot interchange unit 10 transmits and receives digital data words representing subscriber speech to and from a time-shared space division switch 14 on incoming time multiplex lines 12 and outgoing time multiplex lines 13, respectively. In the present embodiment, incoming and outgoing time multiplex lines 12 and 13 convey data words at the repetitive rate of 256 data words per 125-microsecond frame. Each incoming time multiplex line 12 is connected to one of 256 input terminals of time-shared space division switch 14, and each outgoing time multiplex line 13 is connected to one of 256 output terminals of time-shared space division switch 14. Time-shared space division switch 14 interconnects incoming time multiplex lines 12 and outgoing time multiplex lines 13 during periods of time equal to the time duration of a data word to permit communication between selected subscribers connected to different time-slot interchange units 10. The actual switching elements used in time-shared space division switch 14 and the control of time-shared space division switch 14 and time-slot interchange units 10 are well known in the art and are not important to the present invention. Accordingly, they are not described in detail herein. Detailed descriptions of switching elements and their control can be found, however, in J. W. Lurtz, U.S. Pat. No. 4,035,584 and E. H. Hafer et al., U.S. Pat. No. 4,280,217.

Since each incoming time multiplex line 12 and each outgoing time multiplex line 13 conveys data in 256 time separated channels, up to 256 subscribers can be communicating through a given time-slot interchange unit 10 at any given time. The time-slot interchange units of the present invention provide a 4-to-1 concentration ratio, so that four times as many subscribers can be connected to a given time-slot interchange unit, than can communicate through it at any given time. Accordingly, each time-slot interchange unit 10 has the capacity to be connected to up to 1024 (4×256) subscribers and a total of 262,144 (1024×256) subscribers can be served by the time division switching system of FIG. 1, which includes 256 time-slot interchange units 10. It should be noted that the concentration ratio of the actual time-slot interchange units may not all be the same, and that many of the system inputs, or even entire time-slot interchange units, may be connected to trunks or service circuits so that the total number of subscribers served will most likely be less than the 262,144 mentioned above. The embodiment of FIG. 1, having 256 time-slot interchange units 10 each connected to 1024 subscribers is described herein, however, to aid in understanding the present invention.

When a central office, including a time division switching system, such as that shown in FIG. 1, is first placed in service, it may serve far fewer than the maximum number of lines. For example, if a time division switching system of the present embodiment is installed in a community having 2500 subscribers, it may be initially equipped with only three time-slot interchange units 10. As the number of subscribers increases, additional time-slot interchange units 10, each capable of accommodating 1024 new subscribers, can be added as needed. When each new time-slot interchange unit 10 is added, an additional incoming time multiplex line 12 and outgoing time multiplex line 13 must be connected to time-shared space division switch 14 so that all time-slot interchange units can intercommunicate. Accordingly, time-shared space division switch 14 must have sufficient capacity when installed to accommodate up to the largest number of expected time multiplex lines 12 and 13 or it must be capable of expanding to that size. When originally constructed and expanded in accordance with the present invention, time-shared space division switch 14 can be increased in size without reconnection of time multiplex lines 12 and 13 and without loss of service.

Figure 2:
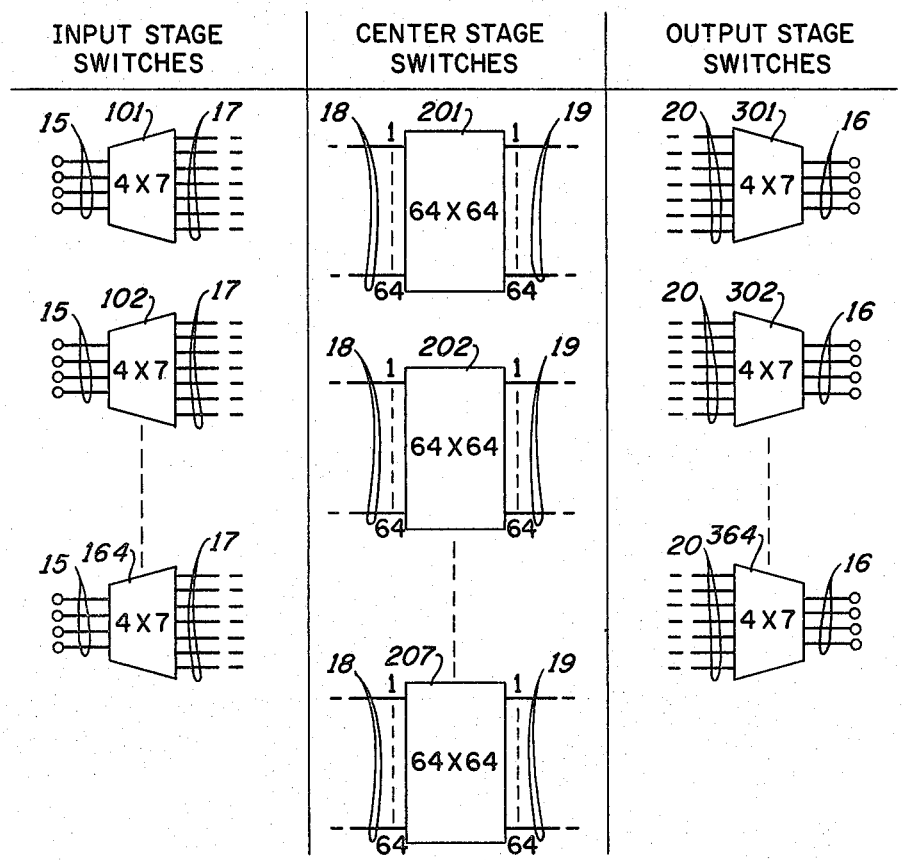
FIG. 2 is a representation of the maximum number of switching units utilized in a first embodiment of the present invention.

FIG. 2 shows the switching units required to provide a 3-stage Clos-type network for 256 incoming and 256 outgoing lines which represent the maximum size for time-shared space division switch 14 of FIG. 1. The interconnection of these switching units is discussed later herein; however, a description of the units will aid in the understanding of our embodiment of the invention. FIG. 2 includes sixty-four input stage switches 101 through 164, each having four input terminals 15 and sixty-four output stage switches 301 through 364, each having four output terminals 16. The selection of four input terminals per input stage switch and four output terminals per output stage switch is a design decision which does not affect the invention herein. In accordance with principles of Clos networks, any input stage switch having X input terminals which is to be connected to an output stage switch having X output terminals must have 2X−1 output terminals, and each output stage switch in such a system having X output terminals must have 2X−1 input terminals. Additionally, 2X−1 center stage switches must be provided. Accordingly, each input stage switch of the present embodiment has seven output terminals and each output stage switch has seven input terminals. Further, seven center stage switches 201 through 207 are provided for in the fully equipped time-shared space division switch 14. Each center stage switch 201 through 207 has sixty-four input terminals so that it can be connected to all of the sixty-four input stage switches 101 through 164. Similarly, each center stage switch 201 through 207 has sixty-four output terminals 19 so that each center stage switch can be connected to all sixty-four output stage switches 301 through 364. The principles of Clos networks are described in detail in the *Bell System Technical Journal* Vol. 32, No. 2, March, 1953, pp. 406–424.

Figure 3:
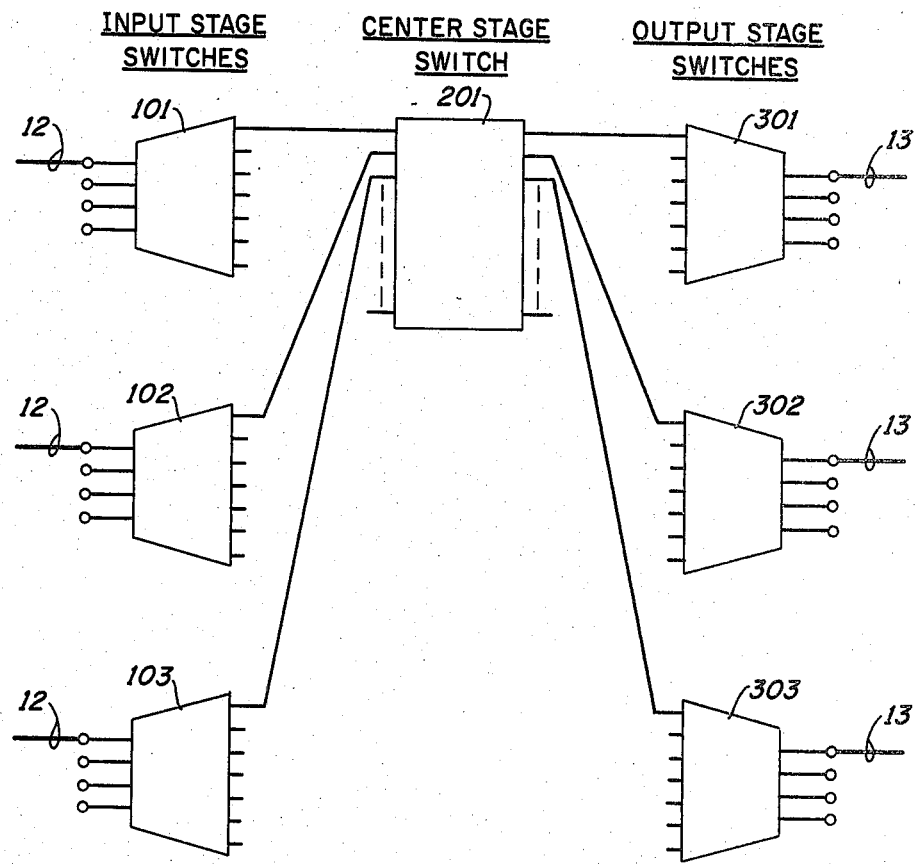
FIGS. 3 and 4 show the interconnection and growth in accordance with a first embodiment of the invention.

FIG. 3 is a block diagram of a time-shared space division switch 14 which is interconnected for communication among three time-slot interchange units 10 over three input time multiplex lines 12 and three output time multiplex lines 13. It should be noted that when connected in accordance with the present invention, the switching units shown in FIG. 3 are all that are needed to provide nonblocking service for three incoming time multiplex lines 12 and three outgoing time multiplex lines 13. In FIG. 3 each incoming time multiplex line 12 is connected to a different one of input stage switches 101 through 103. Additionally, one output terminal of each input stage switch 101 through 103 is connected to one input terminal of center stage switch 201, and one output terminal of center stage switch 201 is connected to one input terminal of each output stage switch 301 through 303. Each of the three outgoing time multiplex lines 13 is connected to one output terminal of a different one of output stage switches 301 through 303.

Each switch unit of the present embodiment may comprise all of the circuitry necessary to switchably interconnect each of its input terminals to each of its output terminals at the time the switch unit is installed. The condition of having all necessary circuitry is called fully equipped herein. Being fully equipped initially, may not be desirable, however, since much of the circuitry of a fully equipped switching unit will not be utilized until all of the input and the outer terminals are connected to time multiplex lines. The best size of growth unit for the switch units of FIG. 2 is one having one input (output) terminal and a number of output (input) terminals equal to the maximum number of output (input) terminals of the switching stage which includes it. Accordingly, input stage growth units include one input and seven output terminals. Center stage growth units include sixty-four input terminals and one output terminal, output stage switch growth units include seven input and one output terminal. Throughout the following description, the actual growth within the switching stages is not described in detail, it being assumed that sufficient circuitry is available in each switch stage to accommodate the number of connected input and output terminals.

As additional subscribers are served by the switching system of the present embodiment, additional time-slot interchange units 10 must be added, and additional input and output time multiplex lines 12 and 13 must be connected to the time-shared space division switch 14. Each new incoming time multiplex line 12 up to the sixty-fourth is connected to an input stage switch which is not connected to any other incoming time multiplex line 12. Similarly, each additional outgoing time multiplex line 13 is connected to an output stage switch 304 to 364 which is not connected to any other outgoing time multiplex line 13. Additionally, one output terminal of each input stage switch connected to an incoming time multiplex line 12 must be connected to one input terminal of center stage switch 201, and one input terminal of each output stage switch connected to an outgoing time multiplex line 13 must be connected to one output terminal of center stage switch 201. The exact order in which the above connections are made is not important to the invention herein, provided that for each added incoming time multiplex line 12, a connection is made to center stage switch 201 which is in turn connected to an outgoing stage switch to which an additional outgoing time multiplex line 13 is connected.

When the number of incoming time multiplex lines 12 exceeds sixty-four, each additional time multiplex line 12 must be connected to one input terminal of an input stage switch such that the number of time multiplex lines connected to any input stage switch does not exceed the number connected to any other input stage switch by more than one. Generally stated, all input stage switches will be connected to either N or N−1 incoming lines where N is the largest number of incoming lines connected to any input stage switch. Whenever the number N increases (which, in the present example, will occur when the 65th, 129th and 193rd incoming lines are connected), additional center stage switches and additional internal connections must be made. In accordance with the present example, the number of center stage switches must equal 2N−1. This means that whenever N increases, two center stage switches must be added. Further, all input stage switches having N input lines connected thereto must have their output terminals connected to all 2N−1 center stage switches, while those input stage switches having N−1 incoming lines connected thereto must have their output terminals connected to 2N−2 center stage switches. Thus, when N increases, all input stage switches having N−1 input terminals connected to incoming lines must be connected to all but one of the center stage switches, while those input stage switches connected to N incoming lines must be connected to all of the 2N−1 center stage switches.

Figure 4:
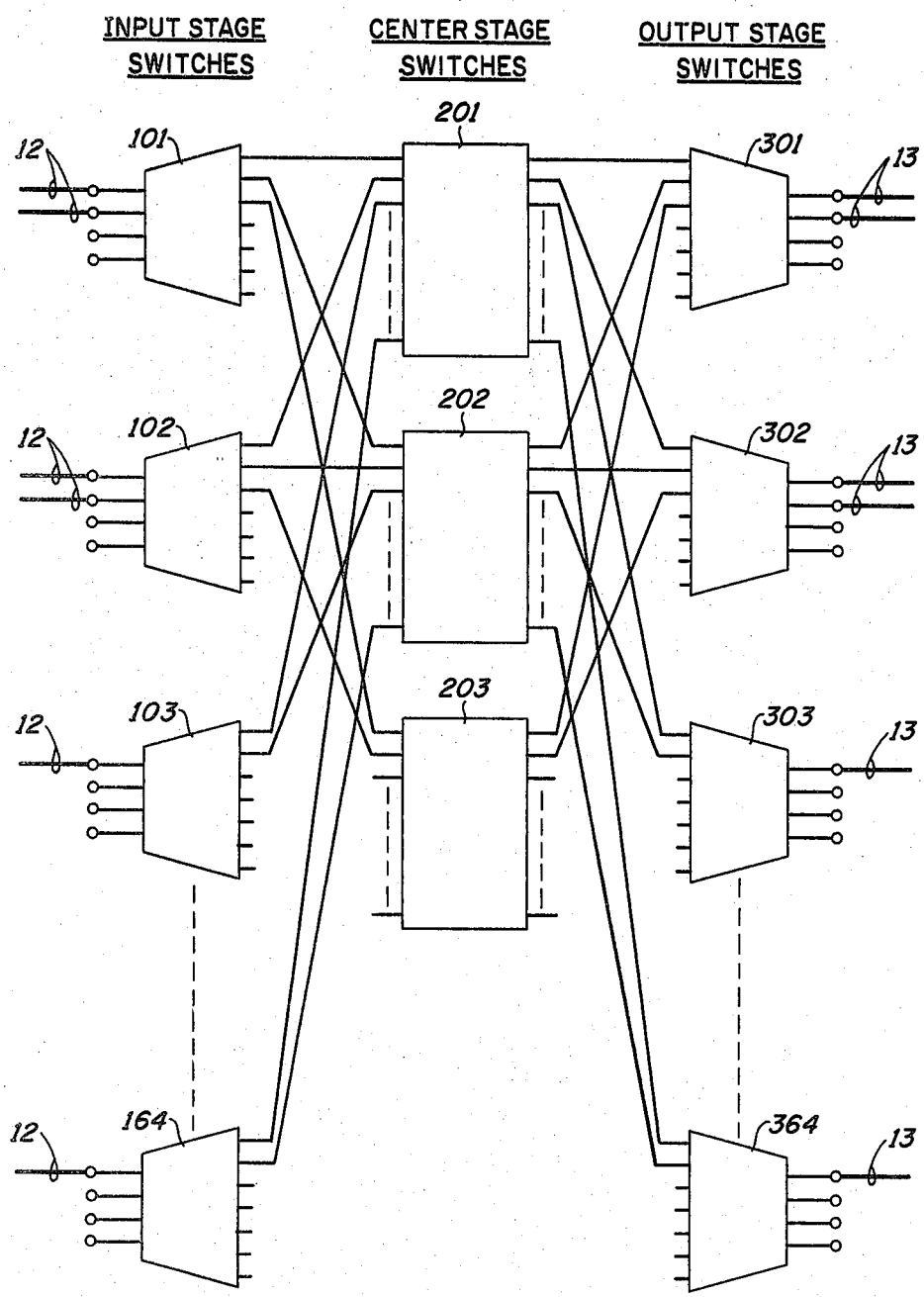

FIG. 4 is a block diagram of a nonblocking time-shared space division switch 14 constructed in accordance with the present invention, to which sixty-six incoming time multiplex lines 12 and sixty-six outgoing time multiplex lines 13 are connected. When sixty-six incoming time multiplex lines 12 are present, two (N=2) incoming time multiplex lines 12 are connected to input stage switches 101 and 102 and one (N−1=1) incoming time multiplex line 12 is connected to each of the remaining sixty-two input stage switches 103 through 164. Since at this point in the present example N=2, three (2×2−1=3) center stage switches 201 through 203 are provided. The output terminals of input stage switches 101 and 102, which are connected to two time multiplex lines 12, are connected to one input terminal of all three center stage switches 201 through 203. Further, the output terminals of input stage switches 103 through 104 are connected to two center stage switches 201 and 202. When other incoming time multiplex lines 12 are added to the network, the incoming stage switch to which each is connected is connected to one input terminal of the center stage switches to which it is not already connected. Similarly, each output stage switch which is connected to a new outgoing time multiplex line 13 must be connected to one output terminal of the center stage switch to which that output stage switch is not already connected.

The connection process, as described above, continues until the 129th incoming time multiplex line 12 and the 129outgoing time multiplex line 13 are to be connected. This connection will result in three (N=3) incoming time multiplex lines 12 being connected to one input stage switch, e.g., 101. In accordance with the present example, two additional center stage switches 204 and 205 are necessary when the 129th incoming time multiplex line 12 is added, making a total of five center stage switches (2×3−1=5). Further, when the 129th incoming line is connected, all of the input stage switches having two lines connected thereto, are connected to four (2×3−2) center stage switches, while those input stage switches having three incoming lines connected thereto are connected to all five of the provided center stage switches. Each additional incoming time multiplex line beyond the 129th is connected as above described such that no input stage switch or output stage switch is connected to a number of time multiplex lines which exceeds the number connected to any other input stage switch or output stage switch by more than one; and each input stage switch and output stage switch to which an additional time multiplex line is connected, must, in turn, be connected to the center stage switch to which it is not already connected. It should be noted that when the 193rd incoming and outgoing time multiplex line are connected, two additional center stage switches must be provided since at least one input stage switch and one output stage switch, e.g., 101 and 301, respectively, are connected to four (N=4) time multiplex lines (2×4−1=7).

Figure 5:
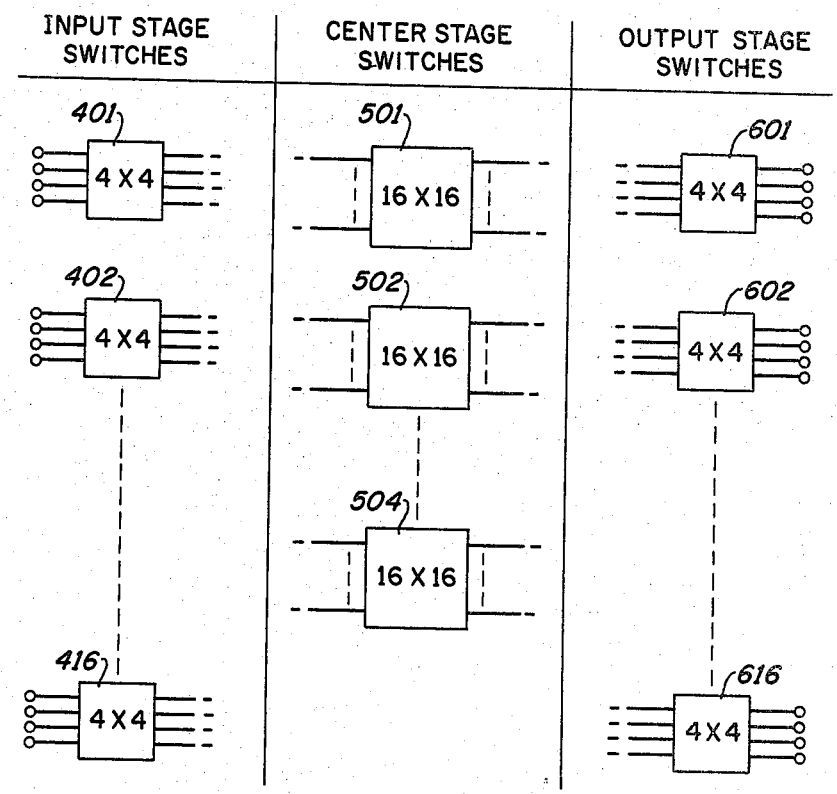
FIG. 5 shows the maximum number of switching units utilized in a second embodiment of the invention.
Figure 6:
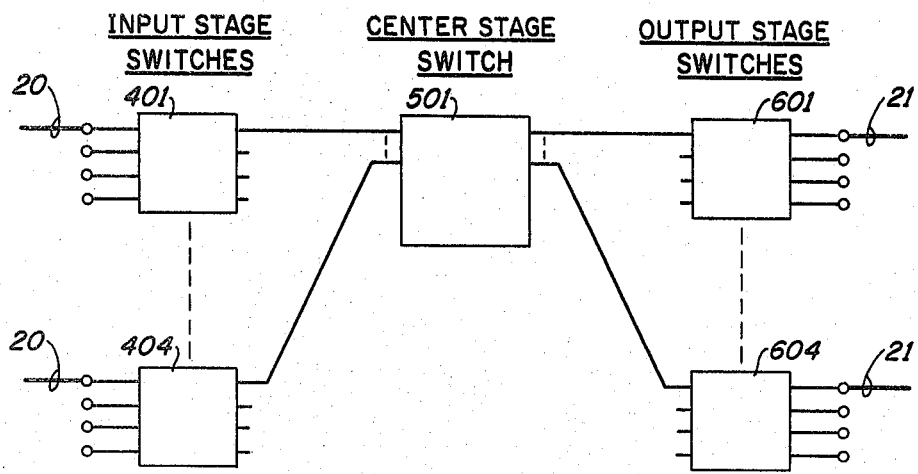
FIGS. 6 and 7 show the interconnection and growth in accordance with a second embodiment of the invention.

The present invention can also be utilized with other types of networks. FIG. 5 shows the switching units for the maximum size of a second exemplary network for interconnecting sixty-four incoming time multiplex lines and sixty-four outgoing time multiplex lines. The embodiment of FIG. 5 includes sixteen input stage switches 401 through 416 each having four input terminals and four output terminals; four center stage switches 501 through 504 each having sixteen input and sixteen output terminals; and sixteen output stage switches 601 through 616 each having four input terminals and four output terminals. The connection of the network of the present embodiment for four incoming time multiplex lines 20 and four outgoing time multiplex lines 21 is shown in FIG. 6. Each incoming time multiplex line 20 is connected to a different one of input stage switches 401 through 404. Additionally, one output terminal of each input stage switch 401 through 404 is connected to one input terminal of center stage switch 501 and one output terminal of center stage switch 501 is connected to one input terminal of output stage switches 601 through 604. Each additional incoming time multiplex line 20 up to the sixteenth is connected to one of the input stage switches 405 through 416 which is not connected to any other incoming time multiplex line 20. Similarly, each additional outgoing time multiplex line 21 up to the sixteenth is connected to an output stage switch 605 through 616 which is not already connected to an outgoing time multiplex line 21.

When the number of incoming time multiplex lines 20 exceeds sixteen, each additional time multiplex line 20 is connected to one input terminal of an input stage switch such that the number of time multiplex lines connected to any input stage switch does not exceed the number connected to any other input stage switch by more than one. Further, in accordance with the predetermined interconnection plans of the present example, the number of center stage switches must equal the number (N) of time multiplex lines 20 connected to the input stage switch having the largest number of incoming time multiplex lines 20 connected thereto.

Figure 7:
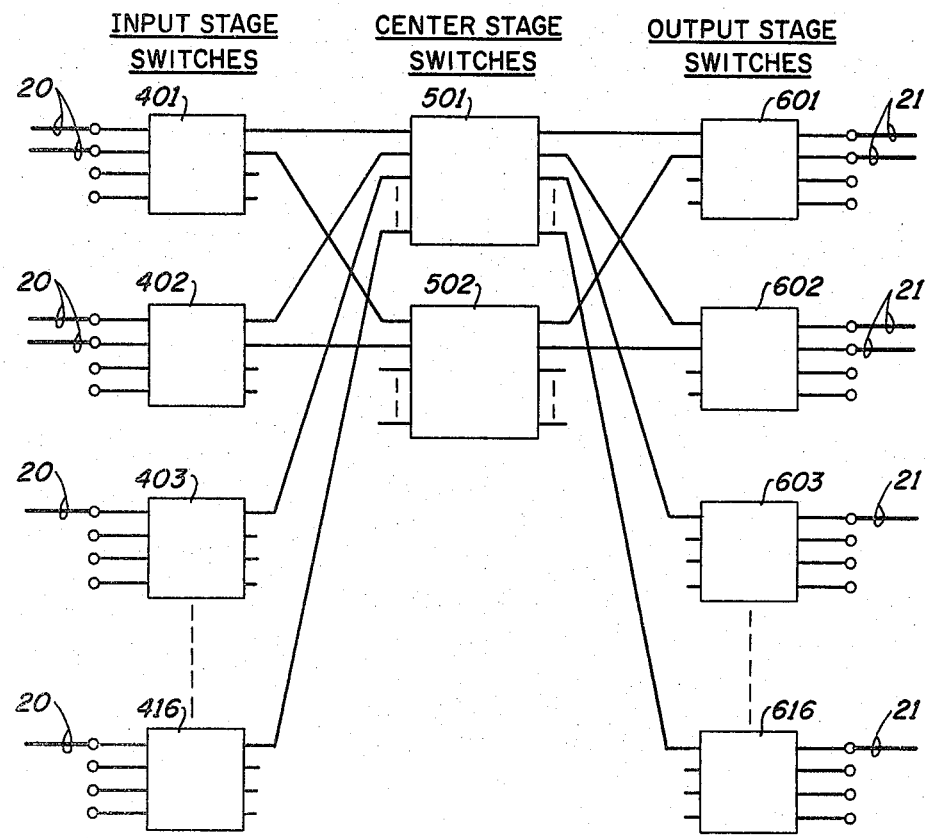

FIG. 7 is a block diagram of a time-shared space division switch interconnected in accordance with the present example to which eighteen incoming time multiplex lines 20 and eighteen outgoing time multiplex lines 21 are connected. When eighteen incoming time multiplex lines 20 are present, two (N=2) incoming time multiplex lines 20 are connected to input stage switches 401 and 402 and one incoming time multiplex line 20 is connected to each of the remaining fourteen input stage switches 403 through 416. Since the maximum number of incoming time multiplex lines 20 connected to any input stage switch is two, two center stage switches 501 and 502 are provided. These are connected to the input stage switches 401 through 416 and the output stage switches 601 through 616 in the manner described above. As additional incoming time multiplex lines 20 and outgoing time multiplex lines 21 are required, they are added, as above described, with center stage switch 503 (FIG. 5) being added when thirty-three incoming time multiplex lines 20 are present (N=3) and center stage switch 504 being added when forty-nine incoming time multiplex lines are present (N=4).

The following is a more generalized discussion of the method described in the preceding embodiments. The maximum number of components of the generalized system comprise up to M input stage switches each having I input terminals and J output terminals, up to M output stage switches having J input terminals and I output terminals and a number of center stage switches which in combination have up to J·M input terminals and J·M output terminals. Each of the first M incoming lines is connected to one terminal of a different input stage switch. Further, one output terminal of each input stage switch which is connected to an incoming line is connected to one of M input terminals of a first center stage switch. The input terminals and output terminals of the output stage switches are connected in a similar manner to the output terminals of the center stage switch and the outgoing lines, respectively.

When the number of incoming lines to be connected exceeds by 1 an integer multiple of M, additional center stage switches must be added in accordance with a predetermined connection plan dictated by the type of network being constructed. In the first example relating to a nonblocking network, two additional center stage switches must be provided each time the number of incoming lines exceeds by 1 an integer multiple of M. In terms of the prior first example, N increases when the number of incoming lines exceeds by 1, an integer multiple of M. In order to maintain the nonblocking characteristics of the first example, all input stage switches must be connected to one of the additional center stage switches so that connections exist between each input stage switch and 2N−2 of the center stage switches. In accordance with the second example, one additional center stage switch must be provided each time the number of incoming lines exceeds by 1 an integer multiple M. Whenever new incoming lines are connected to the time-shared space division switch of either embodiment, they must be connected to the input terminals of input stage switches such that no input stage switch is connected to a number of lines which exceeds the number connected to any other input stage switch by more than one. In the present generalized description it can be seen that when N incoming lines are connected to the input stage switches having the largest number of incoming lines connected thereto, all other input stage switches are connected to N−1 lines. As the number of connected incoming lines increases (but remains less than or equal to the next integer multiple of M), the number of input stage switches connected to N lines increases, while the number of input stage switches connected to N−1 lines decreases.

Whenever an additional incoming line is connected to a given input stage switch, that given input stage switch has N incoming lines connected thereto, and the output terminals of that input stage switch must be connected to all of the available center stage switches. The connection of output stage switches to outgoing lines and the center stage switches is not discussed in detail in this generalized description due to its similarity to the connection of input stage switches.

It is to be understood that the above-described embodiments are merely illustrative of the principles of the invention and that other arrangements may be devised by those skilled in the art without departing from the spirit and scope of the invention.

What is claimed is:

1. A method of growth for a switching network, which switching network comprises an input stage comprising up to M input stage switches, each comprising input terminals and output terminals, a first center stage switch having up to M input and up to M output terminals, and up to M output stage switches, each comprising input terminals and output terminals, when up to M incoming and M outgoing lines are to be connected thereto, said method comprising:

(A) connecting each incoming line to one input terminal of one of said input stage switches, which input stage switch is not already connected to an incoming line;
   (B) connecting one output terminal of each of said input stage switches connected in Step A to one input terminal of said first center stage switch;
   (C) connecting, for each performance of Step B, one output terminal of said first center stage switch to one input terminal of one of said output stage switches, which output stage switch is not already connected to said first center stage switch; and
   (D) connecting one output terminal of each output stage switch connected in Step C to one of said outgoing lines.

2. A method growth in accordance with claim 1 wherein additional incoming and outgoing lines in excess of M are to be connected comprising:

(E) connecting each of said additional incoming lines to one input terminal of one of said input stage switches such that particular ones of said input stage switches are connected to N incoming lines and the remaining ones of said input stage switches are connected to N−1 incoming lines;
   (F) providing a number of additional center stage switches as computed by a predetermined interconnection plan based on the number N of incoming lines connected to said particular ones of said input stage switches;
   (G) connecting one output terminal of each input stage switch which is connected to N incoming lines to one input terminal of each of said additional center stage switches;
   (H) connecting one output terminal of each input stage switch which is connected to N−1 incoming lines to a number of said center stage switches computed by a predetermined interconnection plan based on the number N−1 of incoming lines connected to said remaining ones of said input stage switches;
   (I) connecting each of said additional outgoing lines to one output terminal of one of said output stage switches such that particular ones of said output stage switches are connected to N outgoing lines and the remaining ones of said output stage switches are connected to N−1 outgoing lines;

(J) connecting one input terminal of each output stage switch which is connected to N outgoing lines to one output terminal of each of said additional center stage switches; and (K) connecting one input terminal of each output stage switch which is connected to N−1 outgoing lines to a number of said center stage switches computed by a predetermined interconnection plan based on the number N−1 of outgoing lines connected to said remaining ones of said output stage switches.

3. A method of growth in accordance with claim 2 where Step (F) comprises:

(L) determining a number of additional center stage switches which is equal to 2N−1; and (O) providing a number of additional center stage switches as determined in the performance of Step L.

4. A method of growth in accordance with claim 2 wherein Step F further comprises:

(P) determining a number of additional center stage switches which is equal to N; and (Q) providing a number of additional center stage switches as determined in the performance of Step P.

5. A method of growth in accordance with claim 3 where Step (H) further comprises:

(R) connecting one output terminal of each input stage switch which is connected to N−1 incoming lines to 2N−2 of said center stage switches; and Step K further comprises:

(S) connecting one input terminal of each output stage switch which is connected to N−1 outgoing lines to 2N−2 of said center stage switches.

6. A method of interconnection for a switching network, which switching network comprises up to M input stage switches each comprising input and output terminals and up to M output stage switches each comprising input and output terminals when an equal number of incoming and outgoing lines are present for connection to said network, said method comprising:

(A) connecting each incoming line to one input terminal of one of said input stage switches such that particular ones of said input stage switches are connected to N incoming lines and the remaining ones of said input stage switches are connected to N−1 incoming lines;

(B) providing 2N−1 center stage switches wherein each of said center stage switches comprises up to M input and M output terminals;

(C) connecting one output terminal of each input stage switch which is connected to N incoming lines to one input terminal of each of said center stage switches provided in Step B;

(D) whenever N is greater than or equal to two, connecting one output terminal of each input stage switch which is connected to N−1 incoming lines to 2N−2 of said center stage switches;

(E) connecting each of said outgoing lines to one output terminal of one of said output stage switches such that particular ones of said output stage switches are connected to N outgoing lines and the remaining ones of said output stage switches are connected to N−1 outgoing lines;

(F) connecting one input terminal of each output stage switch which is connected to N outgoing lines to one output terminal of each of said center stage switches provided in Step (B); and (G) whenever N is equal to or greater than two, connecting one input terminal of each output stage switch which is connected to N−1 outgoing lines to 2N−2 of said center stage switches.

7. A method of growth for a switching network which switching network comprises an input stage comprising up to M input stage space division switches, each comprising input terminals and output terminals, a first center stage space division switch having up to M input and up to M output terminals, and up to M output stage space division switches, each comprising input terminals and output terminals, when up to M incoming and M outgoing lines are to be connected thereto, said method comprising:

(A) connecting each incoming line to one input terminal of one of said input stage space division switches, which input stage space division switch is not already connected to an incoming line;

(B) connecting one output terminal of each of said input stage space division switches connected in Step A to one input terminal of said first center stage space division switch;

(C) connecting, for each performance of Step B, one output terminal of said first center stage space division switch to one input terminal of one of said output stage space division switches, which output stage space division switch is not already connected to said first center stage space division switch; and (D) connecting one output terminal of each output stage space division switch connected in Step C to one of said outgoing lines.

* * * * *